United States Patent
Nishida et al.

(10) Patent No.: US 6,611,436 B2
(45) Date of Patent: Aug. 26, 2003

(54) SWITCHING POWER SUPPLY UNIT HAVING A REGULATOR CIRCUIT AND ELECTRONIC APPARATUS USING THE SAME

(75) Inventors: Akio Nishida, Kyoto (JP); Hiroshi Takemura, Muko (JP)

(73) Assignee: Murata Manufacturing Co., Ltd., Kyoto (JP)

(*) Notice: Subject to any disclaimer, the term of this patent is extended or adjusted under 35 U.S.C. 154(b) by 0 days.

(21) Appl. No.: 09/984,748

(22) Filed: Oct. 31, 2001

(65) Prior Publication Data

US 2002/0057583 A1 May 16, 2002

(30) Foreign Application Priority Data

Nov. 15, 2000 (JP) ........................................ 2000-348494

(51) Int. Cl.⁷ ............................................. H02M 3/335
(52) U.S. Cl. ...................... 363/21.07; 363/97; 323/266; 323/267
(58) Field of Search ................................ 323/266, 267; 363/21.01, 21.04, 21.07, 21.08, 97

(56) References Cited

U.S. PATENT DOCUMENTS

| 4,581,690 A | 4/1986 | Russell | 363/17 |
|---|---|---|---|
| 4,642,743 A * | 2/1987 | Radcliffe | 363/97 |
| 4,669,036 A * | 5/1987 | Cowett | 363/97 |
| 4,745,299 A * | 5/1988 | Eng et al. | 363/97 |
| 5,034,871 A * | 7/1991 | Okamoto et al. | 363/97 |
| 5,122,945 A * | 6/1992 | Marawi | 363/97 |
| 5,619,403 A * | 4/1997 | Ishikawa et al. | 363/97 |
| 5,991,168 A | 11/1999 | Farrington et al. | 363/16 |
| 6,392,906 B2 * | 5/2002 | L'Hermite et al. | 363/21.11 |

FOREIGN PATENT DOCUMENTS

| JP | 63-100991 | 6/1988 | ......... H02M/3/28 |
|---|---|---|---|
| JP | 7-123719 A | 5/1995 | ......... H02M/3/28 |
| JP | 11-262262 | 9/1999 | ......... H02M/3/28 |

* cited by examiner

Primary Examiner—Jeffrey Sterrett
(74) Attorney, Agent, or Firm—Keating & Bennett, LLP

(57) ABSTRACT

A switching power supply unit includes a control output circuit, a non-control output circuit, and a regulator circuit. With this switching power supply unit, it is no longer necessary to set the voltage of the non-control output to be greater than a required value when the control output circuit is unloaded or lightly loaded. The regulator circuit is connected to the non-control output circuit and includes a first transistor defining a first impedance element connected in series to the non-control output circuit, a second transistor defining a second impedance element connected between the control output circuit and the base of the first transistor, and a voltage control circuit controlling the impedance of the second transistor such that the output voltage of the regulator circuit is maintained constant.

21 Claims, 4 Drawing Sheets

SWITCHING POWER SUPPLY UNIT HAVING A REGULATOR CIRCUIT AND ELECTRONIC APPARATUS USING THE SAME

BACKGROUND OF THE INVENTION

1. Field of the Invention

The present invention relates to switching power supply units and electronic apparatuses including the same.

2. Description of the Related Art

FIG. 6 shows a circuit diagram of a switching power supply unit related to the present invention. In this figure, a switching power supply unit 1 includes a transformer T having an input winding N1, a first output winding N2, a second output winding N3, and a feedback winding N4, a DC power source Vcc and a switching element Q1 connected in series to the input winding N1, a control circuit 2 connected between the feedback winding N4 and a control terminal of the switching element Q1, a first rectifying circuit 3 connected to the first output winding N2, a constant-voltage-control circuit 4 connected to the output terminal of the first rectifying circuit 3, a second rectifying circuit 6 connected to the second output winding N3, and a regulator circuit 8 connected to the output terminal of the second rectifying circuit 6. The first rectifying circuit 3 and the constant-voltage-control circuit 4 define a first output circuit 5. Additionally, the second rectifying circuit 6 defines a second output circuit 7. The output voltage of an output terminal V1 of the first output circuit 5 is a first output voltage v1, the output voltage of an output terminal V2 of the second output circuit 7 is a second output voltage v2, and the output voltage of an output terminal V3 of the regulator circuit 8 is a third output voltage v3.

The first output winding N2 and the second output winding N3 share a portion thereof such that the output voltage of the second output winding N3 is lower than the output voltage of the first output winding N2. The first rectifying circuit 3 includes a diode D1 and a capacitor C1. The second rectifying circuit 6 includes a diode D2 and a capacitor C2. The constant-voltage-control circuit 4 includes a resistor R1, a photo diode PD, and a shunt regulator SR, which are connected in series, a resistor R2, and a resistor R3, which are also connected in series. The junction of the resistor R2 and the resistor R3 is connected to a control terminal of the shunt regulator SR. The control circuit 2 includes a phototransistor PT. The phototransistor PT and a photodiode PD define a photocoupler. The control circuit 2 turns a switching element Q1 on and off with a feedback signal from the constant-voltage-control circuit 4. In other words, with the feedback control provided on the primary side of the transformer, constant-voltage-control is performed over the first output voltage v1. As a result, the first output voltage v1 becomes a control output. On the other hand, the second output voltage v2 is not feedback-controlled to the primary side, and therefore becomes a non-control output. Thus, the voltage v2 is input to the regulator circuit 8 to perform constant-voltage control over the voltage v2, and consequently becomes the third output voltage v3 lower than the second output voltage v2.

Next, FIG. 7 shows a detailed circuit diagram of the regulator circuit 8. Such a circuit is disclosed in Japanese Unexamined Patent Application Publication No. 11-262262. In FIG. 7, the regulator circuit 8 includes a transistor Q2 defining an impedance element connected in series to the output terminal of the second output circuit 7, a Zener diode ZD connected between the base of the transistor Q2 and a ground, a constant current circuit Io connected between the output terminal of the first rectifying circuit 3 defining the first output circuit and the cathode of the Zener diode ZD, and a capacitor C3 connected between the emitter of the transistor Q2 and another ground.

In the regulator circuit 8 having the structure described above, with the use of the transistor Q2, the second output voltage v2 is converted into the third output voltage v3 having a voltage value approximately equal to the Zener voltage value of the Zener diode ZD to output the voltage v3.

The output of the first output circuit 5 is not output via the regulator circuit 8. Since the regulator circuit 8 uses the first output voltage v1, the voltage v1 is passed through the regulator circuit as shown in FIG. 6. The first output voltage v1 is output from the regulator circuit 8, and no processing is performed on the output v1 in the regulator circuit 8.

The constant-current circuit Io is provided to improve a ripple elimination rate. When the ripple elimination rate is not required to be high, a resistor is sometimes used.

In the switching power supply unit 1 shown in FIG. 6, when the first output circuit 5 outputting the first output voltage v1 is unloaded or lightly loaded, the electric power which can be supplied to the regulator circuit 8 as the load of the second output circuit 7 decreases. However, when the regulator circuit 8 is not unloaded or lightly loaded and large electric power is required, the input electric power of the regulator circuit 8 increases. As a result, due to cross-regulation of the transformer T, the second output voltage v2 drops, and thereby the regulator circuit 8 does not function properly. Therefore, the third output voltage v3 also drops. To prevent this problem, the second output voltage v2 as a non-control output is usually set in advance to be high in expectation of some degree of voltage drop. Consequently, even when the second output voltage v2 slightly drops, the regulator circuit 8 functions properly. However, when the second output voltage v2 is set to be higher than necessary with respect to the third output voltage v3, under normal operating conditions, power loss in the regulator circuit 8 increases. Thus, this reduces the efficiency of the switching power supply unit.

SUMMARY OF THE INVENTION

To overcome the above-described problems, preferred embodiments of the present invention provide a switching power supply unit having a regulator circuit in which it is unnecessary to set the voltage of a non-control output to be higher than a required value. Preferred embodiments of the invention also provide an electronic apparatus incorporating the novel switching power supply unit.

According to a preferred embodiment of the present invention, a switching power supply unit includes a transformer having a primary winding, a first secondary winding, and a second secondary winding, a first output circuit connected to the first secondary winding and outputting a first output voltage constant-voltage-controlled by feedback control provided on the primary side of the transformer, a second output circuit connected to the second secondary winding to output a second output voltage, and a regulator circuit connected to the second output circuit to perform constant-voltage-control over the second output voltage so as to output as a third output voltage, in which a load current flowing through the first output circuit is adjusted according to the third output voltage such that the second output voltage is maintained at at least a desired value.

In addition, in the switching power supply unit, the second output voltage is lower than the first output voltage, and the regulator circuit further includes a first impedance element connected in series to the second output circuit, a second impedance element connected between an output terminal of the first output circuit and a control terminal of the first impedance element, and a voltage control circuit controlling the impedance of the second impedance element such that the third output voltage is maintained constant.

In this switching power supply unit, the first impedance element is a first transistor and the second impedance element is a second transistor.

In addition, the switching power supply unit may also preferably include an overcurrent protecting circuit which causes the second impedance element to be out of conduction when the difference between the first output voltage and the third output voltage is larger than a desired value.

In addition, the switching power supply unit may also preferably include an overcurrent detecting circuit arranged to detect a drop in the third output voltage when the value of a current flowing through the second impedance element is larger than a desired value.

According to another preferred embodiment of the present invention, an electronic apparatus is provided that includes the switching power supply unit of the above-described preferred embodiment of the present invention.

With the above arrangements, in the switching power supply unit and the electronic apparatus according to various preferred embodiments of the present invention, it is unnecessary to set the voltage of the non-control output higher than required. Thus, the efficiency of the switching power supply unit and the electronic apparatus is greatly improved.

Other features, elements, advantages and characteristics of the present invention will become more apparent from the following detailed description of preferred embodiments thereof with reference to the attached drawings.

DETAILED DESCRIPTION OF PREFERRED EMBODIMENTS

Figure 1:
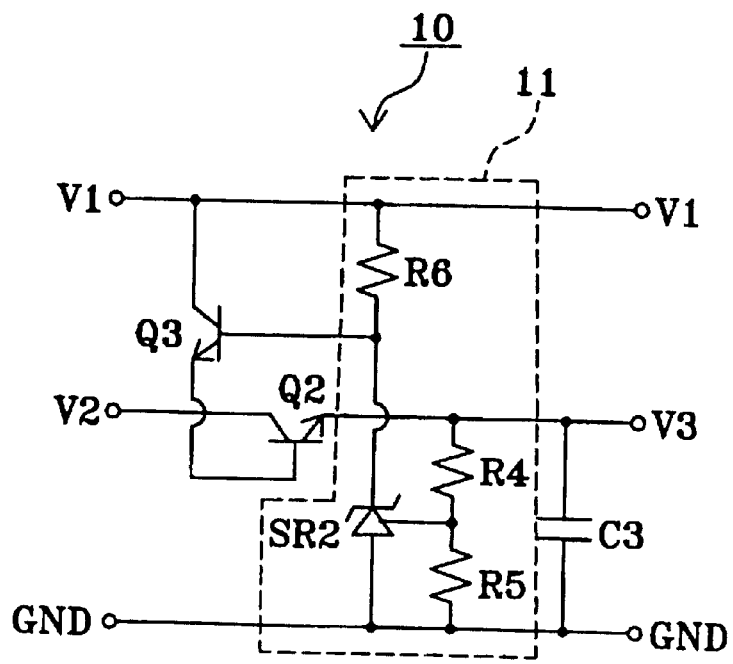
FIG. 1 is a circuit diagram of a regulator circuit included in a switching power supply unit according to a first preferred embodiment of the present invention.
Figure 6:
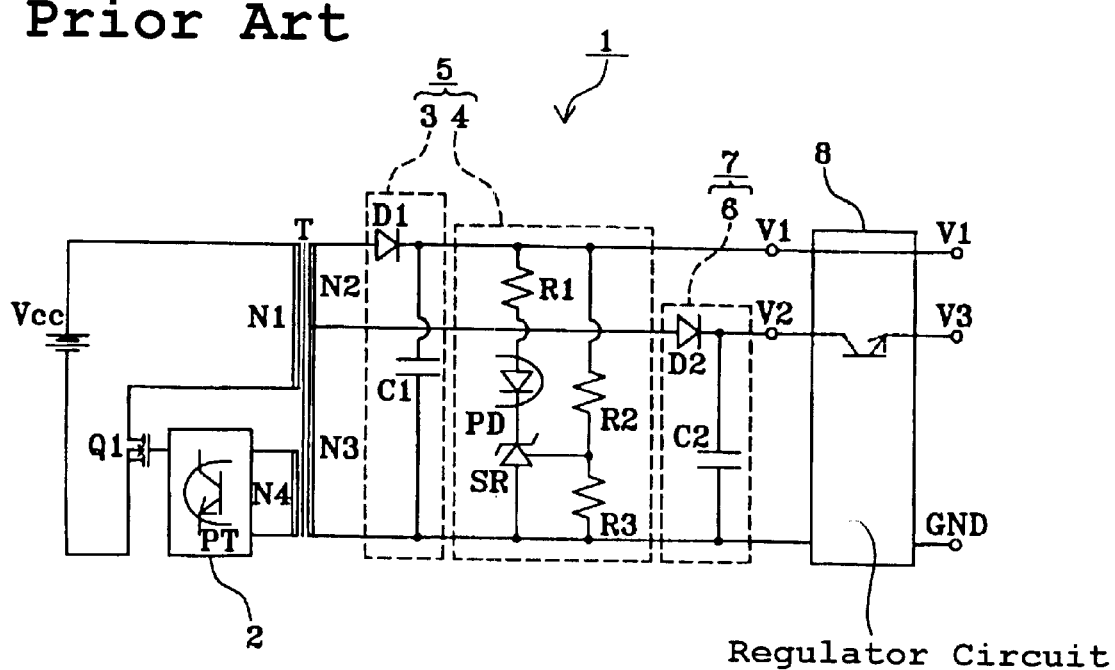
FIG. 6 is a circuit diagram of a switching power supply unit related to the present invention.
Figure 7:
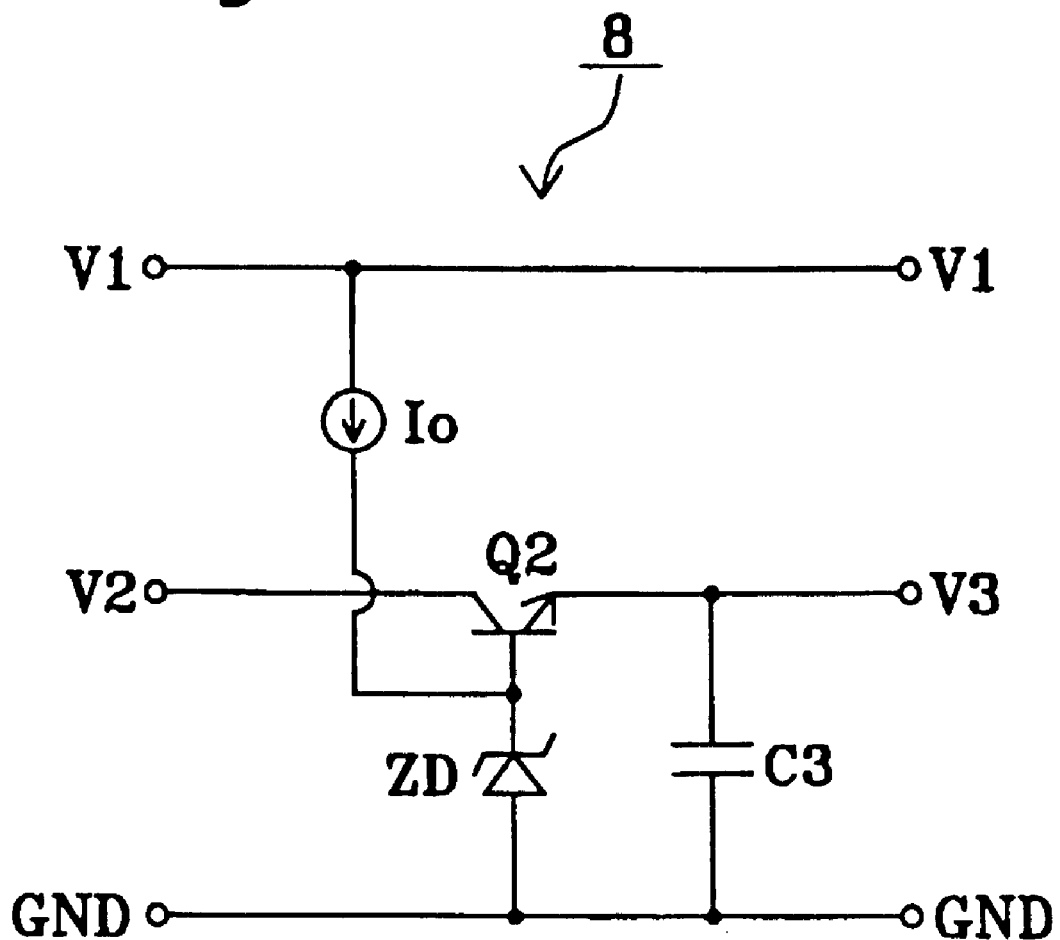
FIG. 7 is a circuit diagram of a regulator circuit used in the switching power supply unit related to the present invention.

FIG. 1 shows a circuit diagram of a regulator circuit included in a switching power supply unit according to a first preferred embodiment of the present invention. In FIG. 1, the same reference numerals are given to components that are equivalent to the components shown in FIG. 7 and the explanation thereof will be omitted. Since components other than the regulator circuit in the switching power supply unit are the same as those of the switching power supply unit shown in FIG. 6, these components will be referred to as shown in FIG. 6 and will not be shown in FIG. 1.

In FIG. 1, a regulator circuit 10 preferably includes a transistor Q2 as a first impedance element connected in series to an output terminal V2 of a second output circuit 7, a transistor Q3 as a second impedance element connected between an output terminal V1 of a first output circuit 5 and the base of the transistor Q2, a series circuit including a resistor R6 and a shunt regulator SR2 connected between the output terminal V1 of the first output circuit 5 and a ground, a series circuit composed of a resistor R4 and a resistor R5 connected between the emitter of the transistor Q2 and the ground, and a capacitor C3 connected between the emitter of the transistor Q2 and the ground. Of these components, the resistors R4, R5, and R6, and the shunt regulator SR2 define a voltage control circuit 11.

The junction of the resistor R4 and the resistor R5 is connected to a control terminal of the shunt regulator SR2. The junction of the resistor R6 and the shunt regulator SR2 is connected to the base of the transistor Q3.

In the regulator circuit 10 having the above-described structure, the resistors R4 and R5 divide and detect the third output voltage v3, and a signal corresponding to the third output voltage v3 is input to the base of the transistor Q3 via the shunt regulator SR2. As a result, since the impedance between the collector of the transistor Q2 and the emitter thereof is controlled, the current flowing from the output terminal V1 of the first output circuit 5 into the base of the transistor Q2 via the transistor Q3 is controlled. Thus, the voltage of the emitter of the transistor Q2, that is, the third output voltage v3 is constant-voltage-controlled.

Next, the case in which the first output circuit 5 defining a control output is unloaded or lightly loaded will be described. When the first output circuit 5 is unloaded or lightly loaded, as described above, the second output voltage v2 defining a non-control output substantially drops, and also, the third output voltage v3 is on the verge of dropping from a desired voltage. In this situation, in the regulator circuit 10, the resistors R4 and R5 detect the third output voltage v3 to control the shunt regulator SR2 and thereby the cathode current of the shunt regulator SR2 decreases. As a result, since a large current is supplied to the base of the transistor Q3, the current flowing between the collector of the transistor Q3 and the emitter thereof increases. The current flowing between the collector of the transistor Q3 and the emitter thereof is also the load current of the first output circuit 5. Thus, the load of the first output circuit 5 is slightly increased. Consequently, due to cross-regulation of a transformer T, the second output voltage v2 rises to a level at which the regulator circuit 10 functions normally, so that the third output voltage v3 is controlled at a desired voltage value. In this situation, the collector voltage of the transistor Q2 as the second output voltage v2 is controlled such that the value of the collector voltage thereof is equal to a value obtained by adding the Vce saturation voltage of the transistor Q2 to the third output voltage v3.

Figure 2:
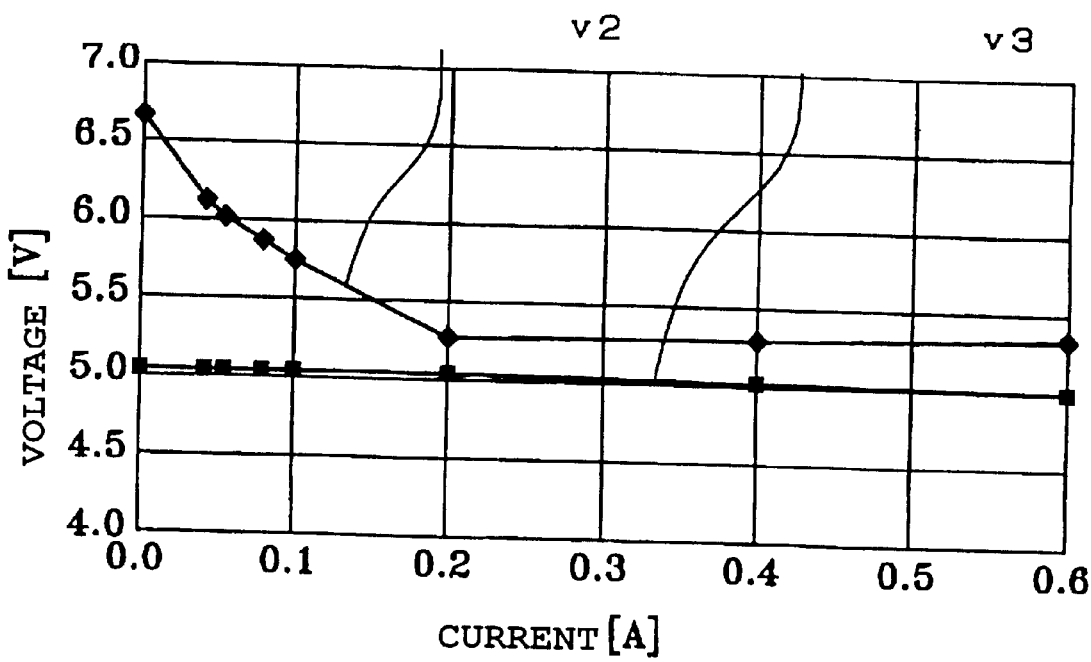
FIG. 2 is a graph showing characteristics of the voltage-current relationships between the input voltage and the output voltage of the regulator circuit included in the switching power supply unit shown in FIG. 1.

FIG. 2 shows the voltage-current relationship obtained in the input voltage (the second output voltage v2) of the regulator circuit 10 when the first output circuit 5 is lightly loaded, and the voltage-current relationship obtained in the output voltage (the third output voltage v3) of the regulator circuit 10. As shown in FIG. 2, in the second output voltage v2, even though the current value increases, a drop in the voltage stops at approximately 5.3 V, and the voltage does not drop further. Accordingly, in the third output voltage v3, even though the current value increases, the voltage remains approximately 5.0 V.

Thus, in the switching power supply unit of this preferred embodiment of the present invention, with the use of the regulator circuit 10, according to the third output voltage v3, the load current of the first output circuit 5 is adjusted to maintain the second output voltage v2 at a predetermined value or higher. In other words, even when the first output circuit 5 is unloaded or lightly loaded, the current flowing through the transistor Q3 of the regulator circuit 10 becomes the load current of the first output circuit 5. Thus, the second output voltage v2 defining the non-control output does not decrease significantly. Thus, it is unnecessary to set the second output voltage v2 to a high value in advance, so that loss in the regulator circuit 10 under normal operation is minimized. As a result, the efficiency of the switching power supply unit is greatly improved.

Figure 3:
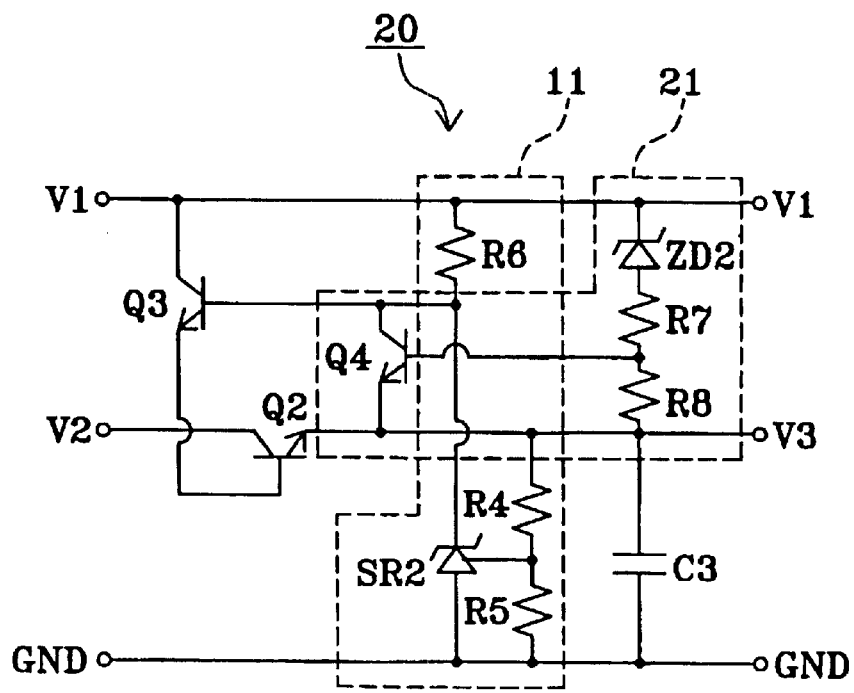
FIG. 3 is a circuit diagram of a regulator circuit included in a switching power supply unit according to a second preferred embodiment of the present invention.

FIG. 3 shows a circuit diagram of a regulator circuit of a switching power supply unit according to a second preferred embodiment of the present invention. In FIG. 3, the same reference numerals are given to components that are equivalent to those shown in FIG. 1 and the explanation of thereof will be omitted.

In FIG. 3, in addition to the arrangement of the regulator circuit 10 shown in FIG. 1, a regulator circuit 20 preferably includes a series circuit including a Zener diode ZD2, a resistor R7, and a resistor R8 connected between an output terminal V1 of a first output circuit 5 and the emitter of a transistor Q2, and an overcurrent preventing circuit 21 including a transistor Q4 connected between the base of a transistor Q3 and the emitter of the transistor Q2. The junction of the resistor R7 and the resistor R8 is connected to the base of the transistor Q4.

In the regulator circuit 20 having the above-described structure, the operation performed when the first output circuit 5 as a control output is unloaded or lightly loaded is the same as the operation of the regulator circuit 10 shown in FIG. 1, and the regulator circuit 20 provides the same advantages.

Next, the situation where the output of the regulator circuit 20 is in a short-circuited state or an overcurrent state (heavily loaded state) will be described. When the output of the regulator circuit 20 is under heavy load, current greater than the capacity of the regulator circuit 20 flows and thereby the third output voltage v3 drops. After the drop of the third output voltage v3, when the value of the potential difference between the first output voltage v1 and the third output voltage v3 is greater than a desired value, the voltage across the Zener diode ZD2 is greater than a Zener voltage to turn on the diode ZD2, and then, a current flows through the Zener diode ZD2, the resistor R7, and the resistor R8. Due to the current flowing through the resistor R8, a potential difference is generated between both ends of the resistor R8. The potential difference is applied between the base and the emitter of the transistor Q4 to turn on the transistor Q4. When the transistor Q4 is turned on, the base voltage of the transistor Q3 as a second impedance element drops and thereby the transistor Q3 is turned off. When the transistor Q3 is turned off, the transistor Q2 defining a first impedance element is turned off and thereby the third output voltage v3 is not output. Accordingly, when the output of the regulator circuit 20 is under a heavy load, an overcurrent condition is prevented by controlling the second impedance element.

When the heavily loaded condition in the regulator circuit 20 is cancelled, due to a current flowing through the load of the regulator circuit 20 via the resistor R6 and the transistor Q4, electric charge is stored in a capacitor 3 and thereby the third output voltage v3 increases. Accordingly, the potential difference between the first output voltage v1 and the third output voltage v3 is equal to or less than a desired value and thereby the Zener diode ZD2 is turned off. Consequently, since current does not flow through the resistor R5, the transistor Q4 is turned off and the transistors Q2 and Q3 are turned on, such that the third output voltage v3 is output at a desired value.

Figure 4:
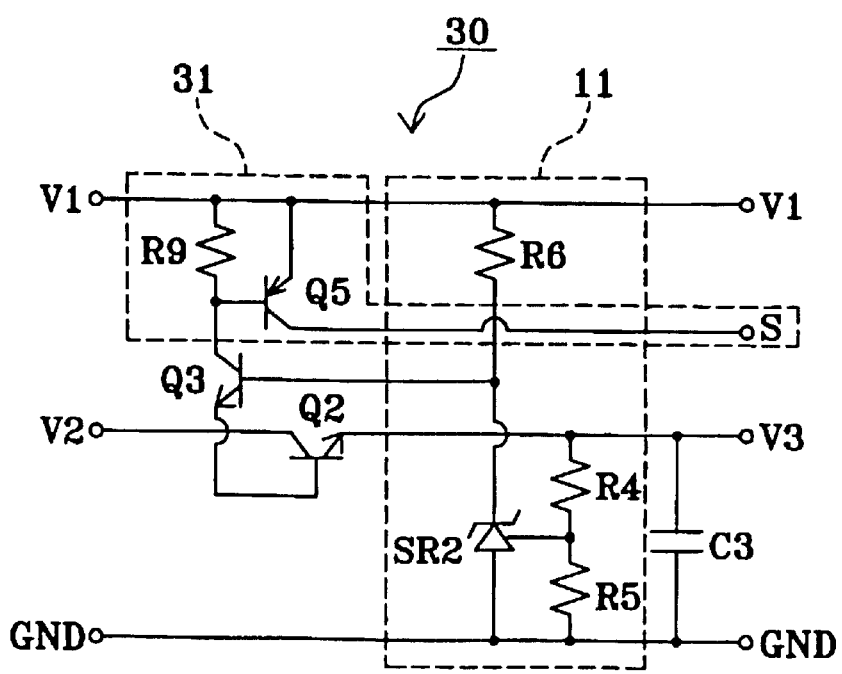
FIG. 4 is a circuit diagram of a regulator circuit included in a switching power supply unit according to a third preferred embodiment of the present invention.

FIG. 4 shows a circuit diagram of a regulator circuit of a switching power supply unit according to a third preferred embodiment of the present invention. In FIG. 4, the same reference numerals are given to components that are equivalent to those shown in FIG. 1 and the explanation of thereof will be omitted.

In FIG. 4, in addition to the arrangement of the regulator circuit 1 shown in FIG. 1, a regulator circuit 30 preferably includes a resistor R9 connected between an output terminal V1 of a first output circuit 5 and the collector of a transistor Q3 defining a second impedance element and an overcurrent detecting circuit 31 defined by a PNP transistor Q5 having the emitter connected to the output terminal V1 of the first output circuit 5 and the base connected to the collector of the transistor Q3. In this situation, the collector of the transistor Q5 is connected to a signal terminal S.

In the regulator circuit 30 having the above-described structure, the operation performed when the first output circuit 5 as a control output is under a non-load or light load condition is the same as the operation of the regulator circuit 10 shown in FIG. 1, and the regulator circuit 30 provides the same advantages.

Next, the situation in which the output of the regulator circuit 30 is in a short-circuited state or an overcurrent state (heavily loaded state) will be described. When the output of the regulator circuit 30 is under heavy load and thereby current increases, to increase the current flowing between the collector and the emitter of the transistor Q2 as the first impedance element, current flowing between the collector and the emitter of the transistor Q3 as the second impedance element increases. Since the current flowing through the collector and the emitter of the transistor Q3 is also the current flowing through the resistor R9, due to the increased current, the potential difference between both ends of the resistor R9, that is, the voltage between the base and the emitter of the transistor Q5 increases. Then, when the output current of the regulator circuit 30 increases beyond a desired value and the voltage between the base and the emitter of the transistor Q5 reaches an ON voltage, the transistor Q5 is turned on and a signal terminal S connected to the collector of the transistor Q5 outputs a signal indicating that the output of the regulator circuit 30 is under heavy load and overcurrent is flowing. Thus, according to the magnitude of the current flowing through the second impedance element, an alarm signal showing the heavily loaded condition and overcurrent condition of the regulator circuit 30 are output.

In each of the above-described preferred embodiments, although the second output voltage is set to be lower than the first output voltage, this invention is not restricted to this case. Only the structure for adjusting the load current of the first output circuit according to the third output voltage is required. Thus, in contrast, the second output voltage may be set to be higher than the first output voltage. Even in this case, the same advantages are obtained as in the case in which the second output voltage is set to be lower than the first output voltage. Furthermore, in each of the above-described preferred embodiments, the load current of the first output circuit is consumed in the regulator circuit according to the third output voltage. However, the load current does not necessarily have to be consumed in the regulator circuit. For example, a structure may be used in which a load connected to the first output circuit adjusts such that when the third output voltage is on the verge of dropping, impedance drops and thereby the load current of the first output circuit increases.

In addition, each of the above-described preferred embodiments preferably includes the single second output circuit as the non-control output. Alternatively, in the switching power supply unit of the present invention, a plurality of second output windings and a second output circuit may be provided, or a single second output winding having a plurality of second output circuits may be provided. In any case, the same advantages are obtained. Furthermore, in each of the above-described preferred embodiments, portions of the first output winding and the second output winding are preferably mutually shared. However, the first and second output windings may be independent windings. Additionally, although the output of the second output circuit is preferably used only as the input of the regulator circuit in each of the previous preferred embodiments, the output of the second output circuit may be directly output outside. Also, the first and second impedance elements are not restricted to transistors, and they may be different impedance elements such as field-effect transistors (FET) or other suitable components.

Figure 5:
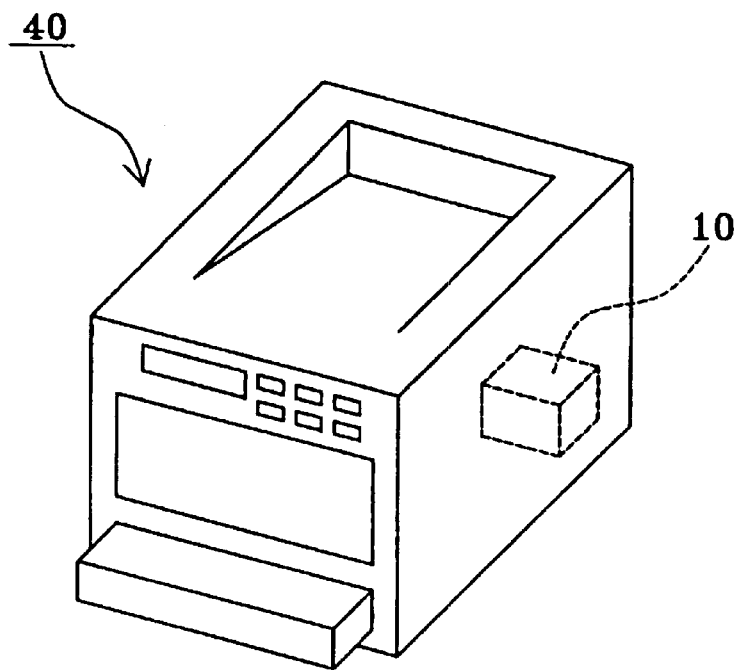
FIG. 5 is a perspective view of an electronic apparatus according to a fourth preferred embodiment of the invention.

FIG. 5 shows a perspective view of an electronic apparatus according to a fourth preferred embodiment of the present invention. In FIG. 5, a printer 40, as one example of the electronic apparatus, includes the switching power supply unit 10 of other preferred embodiments of the present invention as a component of a power supply circuit.

A first output circuit of the switching power supply unit 10 is a power supply of a section relating to printing performed by the printer 40. A second output circuit is a power supply of a digital circuit controlling the entire printer 40. The section relating to printing performed by the printer 40 consumes electric power when the printer is printing, and the section consumes very little electric power during a stand-by status in which printing is not performed. In contrast, the digital circuit consumes approximately the same amount of electric power regardless of whether printing is performed or not. Thus, the first output circuit is under light load during stand-by. However, with the use of the switching power supply unit 10, a drop in the output voltage of the second output circuit is prevented, such that the reliability of the apparatus is greatly increased.

Thus, in the printer 40 of this preferred embodiment of the present invention, by using the switching power supply unit according to other preferred embodiments of the present invention, the efficiency and the reliability is greatly increased.

The printer 40 shown in FIG. 5 preferably includes the switching power supply unit incorporating the regulator circuit 10 shown in FIG. 1. Alternatively, the switching power supply unit including regulator circuit 20 shown in FIG. 3 or the regulator circuit 30 shown in FIG. 4 may be used to obtain the same advantages.

Furthermore, the electronic apparatus of the present invention is not restricted to a printer, and includes various types of electronic apparatuses requiring DC power supply units having stabilized voltages, such as note book personal computers and mobile information apparatuses, including many other electronic apparatuses.

As described above, in the switching power supply unit according to various preferred embodiments of the present invention, even when the output of the first output circuit defining a control output is under a non-load or light load condition, the second output voltage of the second output circuit defining a non-control output is maintained at a minimum value. Thus, the third output voltage is maintained at a desired value. Additionally, since it is unnecessary to set the second output voltage to a value greater than required, reduction in the efficiency of the switching power supply unit is prevented.

In addition, when the regulator circuit is under heavy load, the overcurrent preventing circuit causes the second impedance element to be out of conduction. As a result, overcurrent in the regulator circuit is prevented.

In addition, when the regulator circuit is under heavy load, the overcurrent detecting circuit detects a current flowing through the second impedance element. As a result, overcurrent conditions in the regulator circuit are detected.

In addition, when the electronic apparatus of various preferred embodiments of the present invention includes the switching power supply unit of other preferred embodiments of the present invention, the efficiency and reliability of the apparatus is greatly improved.

While the present invention has been particularly shown and described with reference to preferred embodiments thereof, it will be understood by those skilled in the art that the foregoing and other changes in form and details can be made without departing from the spirit and scope of the invention.

What is claimed is:

1. A switching power supply unit comprising:
   a transformer having a primary winding, a first secondary winding, and a second secondary winding;
   a first output circuit connected to the first secondary winding and outputting a first output voltage constant-voltage-controlled by feedback control provided on a primary side of the transformer;
   a second output circuit connected to the second secondary winding to output a second output voltage; and
   a regulator circuit connected to the second output circuit to perform constant-voltage-control over the second output voltage so as to output as a third output voltage; wherein
   a load current flowing through the first output circuit is adjusted according to the third output voltage such that the second output voltage is maintained at a desired value or more; and
   the regulator circuit includes a first impedance element connected in series to the second output circuit, a second impedance element connected between an output terminal of the first output circuit and a control terminal of the first impedance element, and a voltage control circuit controlling the impedance of the second impedance element such that the third output voltage is maintained constant.

2. The switching power supply unit according to claim 1, wherein the second output voltage is lower than the first output voltage.

3. A switching power supply unit according to claim 1, wherein the first impedance element is a first transistor and the second impedance element is a second transistor.

4. A switching power supply unit according to claim 1, further comprising an overcurrent protecting circuit causing the second impedance element to be out of conduction when the difference between the first output voltage and the third output voltage is greater than a desired value.

5. A switching power supply unit according to claim 1, further comprising an overcurrent detecting circuit detecting a drop in the third output voltage when the value of a current flowing through the second impedance element is greater than a desired value.

6. A switching power supply unit according to claim 5, wherein the overcurrent detecting circuit includes a PNP transistor having an emitter connected to the first output circuit and a base connected to the second impedance element.

7. A switching power supply unit according to claim 4, wherein the overcurrent protecting circuit includes a transistor connected between the second impedance element and the first impedance element.

8. A switching power supply unit according to claim 1, wherein the regulator circuit includes a series circuit including a Zener diode, a first resistor, and a second resistor connected between the first output circuit and the first impedance element.

9. A switching power supply unit according to claim 1, wherein the regulator circuit includes a first resistor connected between the first output circuit and the second impedance element.

10. A switching power supply unit according to claim 1, wherein the voltage control circuit includes a series circuit including a first resistor and a shunt regulator connected between the first output circuit and a ground, a series circuit including a second resistor and a third resistor connected between the first impedance element and the ground.

11. A switching power supply unit according to claim 1, wherein the second output voltage is less than the first output voltage.

12. A switching power supply unit according to claim 1, wherein the second output voltage is higher than the first output voltage.

13. A switching power supply unit according to claim 1, wherein the load current of the first output circuit is consumed in the regulator circuit according to the third output voltage.

14. A switching power supply unit according to claim 1, wherein the first secondary winding and the second secondary winding mutually share a common winding portion.

15. An electronic apparatus comprising the switching power supply unit according to claim 1.

16. An electronic apparatus according to claim 15, wherein the electronic apparatus is a printer.

17. A switching power supply unit comprising:
 a control output circuit;
 a non-control output circuit; and
 a regulator circuit connected to the non-control output circuit and including a first transistor defining a first impedance element connected in series to the non-control output circuit, a second transistor defining a second impedance element connected between the control output circuit and the base of the first transistor, and a voltage control circuit controlling the impedance of the second transistor such that the output voltage of the regulator circuit is maintained constant.

18. A switching power supply unit according to claim 17, wherein the control output circuit includes a first output circuit outputting a first output voltage constant-voltage-controlled and the non-control output circuit includes a second output circuit outputting a second output voltage.

19. A switching power supply unit according to claim 18, wherein the regulator circuit outputs a third output voltage and the voltage control circuit adjusts the load current of the first output circuit according to the third output voltage.

20. An electronic apparatus comprising the switching power supply unit according to claim 17.

21. An electronic apparatus according to claim 20, wherein the electronic apparatus is a printer.

* * * * *